Figure 1:
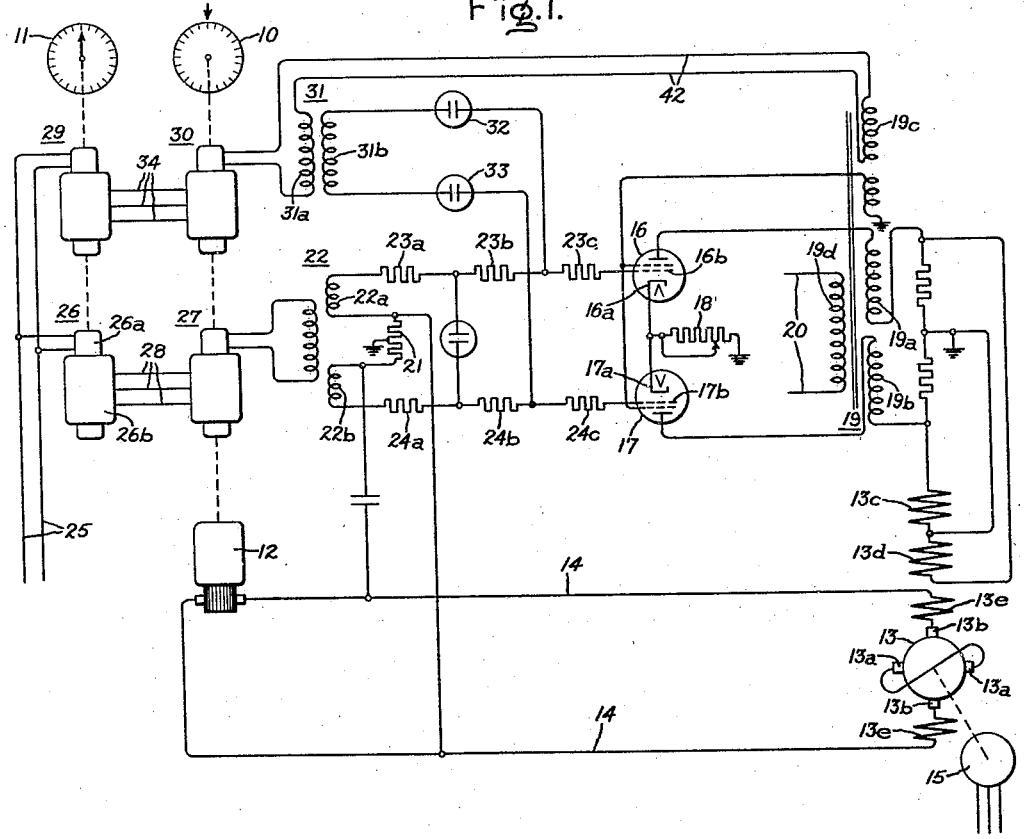

Sept. 17, 1946.   S. GODET   2,407,876
FOLLOW-UP CONTROL SYSTEM
Filed Nov. 30, 1943

Inventor:
Sidney Godet,
by Harry E. Dunham
His Attorney.

Patented Sept. 17, 1946

2,407,876

UNITED STATES PATENT OFFICE 2,407,876

FOLLOW-UP CONTROL SYSTEM

Sidney Godet, Albany, N. Y., assignor to General Electric Company, a corporation of New York Application November 30, 1943, Serial No. 512,359

2 Claims. (Cl. 172—239)

This invention relates to control systems, more particularly to follow-up control systems, and it has for an object the provision of a simple, reliable, and improved control system of this character.

More specifically, this invention relates to follow-up control systems in which Selsyn systems are used as indicators of system error, i. e., positional disagreement of the pilot device and driven object, to control the driving means to drive the driven object into correspondence with the pilot device. In certain of these follow-up systems, a low speed Selsyn system is provided which exercises a coarse control over the driving means when the error exceeds a predetermined value, and a high speed Selsyn system is provided for exercising a fine highly accurate control when the error is less than this predetermined value. Means responsive to a predetermined magnitude of the coarse control voltage are provided for transferring the control of the driving means from one to the other of these fine and coarse control means as the error becomes greater or less than the predetermined value.

The high speed and low speed Selsyn systems produce alternating voltages of which the effective values vary sinusoidally with the magnitude of the error; varying from zero at zero error to a positive maximum at 90 degrees rotation of the Selsyn, zero at 180 degrees, negative maximum at 270 degrees, and zero at 360 degrees. The phase of this voltage reverses at zero and 180 degrees. The control is so designed that the direction of rotation of the driving means which drives the driven object depends upon the phase of the control voltage. Consequently, when the error is less than 180 degrees, the driving means operates in the direction to drive the driven object toward correspondence with the pilot device by the shortest path, and when the error exceeds 180 degrees, the driving means operates in the reverse direction. Thus, zero error is a point of stable equilibrium for a Selsyn system which has a gearing ratio of 1:1 with respect to the driven object; the 180-degree error point is a point of unstable equilibrium. That is to say, the system can come to rest with the driven object exactly 180 degrees out of phase with the pilot device. However, if this error is increased or decreased in the slightest degree, the phase of the resultant control voltage produced by the one speed Selsyn system will be such as to energize the driving means for operation in the direction to drive the driven object toward zero error or correspondence with the pilot device.

In order that the stable positions of the fine and coarse systems should coincide, the high and low speed Selsyn systems were aligned so that the voltages produced by both Selsyn systems were in phase with each other within a predetermined zone on either side of zero error. When the ratio between the high and low speed Selsyn systems is an even number, which frequently it is required to be, the voltages produced by the high and low speed Selsyn systems are of opposite phase within a predetermined zone on either side of the 180-degree error point. Within this zone, the coarse control voltage is less than the predetermined value at which the control is transferred to the fine controlling means. If an attempt is made to synchronize the system from a point within this zone, the coarse system never takes control, and the fine system holds the driven object at the 180-degree error point, because this is a stable point as far as the fine system is concerned. In other words, with this even numbered ratio between the high and low speed Selsyn systems, the 180-degree error point becomes a false point of stable equilibrium. This condition is highly undesirable, since it is possible for the follow-up system to become synchronized at 180 degrees error and to remain so synchronized as long as the error remains within this predetermined zone on either side of 180 degrees. Accordingly, a more specific object of this invention is the provision of a follow-up system utilizing high and low speed Selsyn error indicating systems in which false points of stable equilibrium are entirely eliminated.

In carrying the invention into effect in one form thereof, high and low speed Selsyn systems are provided for detecting the system error of a follow-up system and effecting a fine, highly accurate control of the driving means at small errors and a coarse control at large errors. The ratio of the driving connections between the high and low speed Selsyn systems is an even number. The transmitter and receiver regulator of the low speed Selsyn system are initially misaligned by approximately $90/n$ degrees in which $n$ is the even numbered ratio between the high and low speed Selsyn systems. As a result of this misalignment of the low speed Selsyn system, the cyclically varying effective value of the control voltage produced by the low speed Selsyn system is dephased with respect to the control voltage produced by the high speed Selsyn system approximately one-quarter cycle of the high speed Selsyn control voltage, so that at zero error, the low speed Selsyn system produces a voltage which is proportional to the misalignment of the high and low speed Selsyn systems. To neutralize this zero error voltage, an alternating voltage of fixed magnitude equal to the low speed Selsyn voltage at zero error and opposite in phase is added to the output of the low speed Selsyn system. As a result, the unstable zero for the coarse system becomes an unstable zero for the fine system also.

Figure 2:
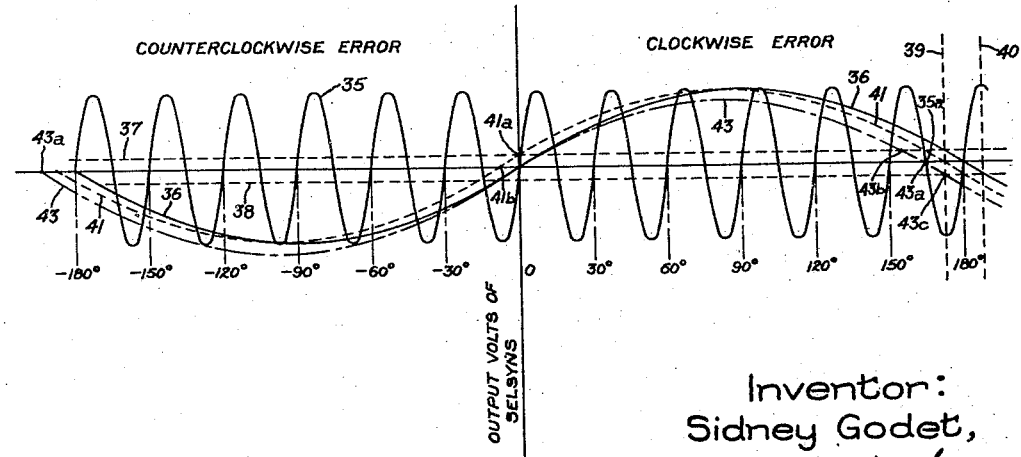

For a better and more complete understanding of the invention, reference should now be had to the following specification and to the accompanying drawing of which Fig. 1 is a simple, diagrammatical sketch of an embodiment of the invention, and Fig. 2 is a chart of characteristic curves which facilitate an understanding of the invention.

Referring now to the drawing, an object 10 is to be driven in positional agreement with a pilot or control device 11 by suitable driving means such, for example, as represented by the direct current motor 12 to the drive shaft of which the object 10 is connected by means of suitable reduction gearing (not shown). Direct current is supplied to the armature of the motor 12 by means of a generator 13 having a pair of short circuited armature brushes 13a and a pair of load brushes 13b to which the armature of the motor 12 is connected by means of conductors 14. The generator 13 is an armature reaction excited dynamoelectric machine and is driven at a speed which is preferably substantially constant, by any suitable driving means such as an induction motor 15, to the drive shaft of which the armature reaction machine is connected by suitable coupling means (not shown). The axis of the flux which is produced by the short circuited armature brushes is referred to as the short circuit axis, and the axis which is displaced 90 electrical degrees from the short circuit axis is referred to as the control axis. The net flux along the control axis is produced by the two opposing control field windings 13c and 13d, a series compensting field winding 13e, and the armature reaction of the load current which flows through the load brushes 13b. This net control axis flux produces the voltage at the brushes 13a which causes current to flow in the short circuit, and the flux along the short circuit axis, which is produced by the short circuit current, produces the voltage at the load brushes 13b which causes load current to flow. The important characteristics of dynamoelectric machine 13 are its high speed of response and its exceptionally high amplification factor, i. e., the ratio between the electrical power supplied to the control field winding and the electrical power delivered at the load brushes of the machine.

The control field windings 13c and 13d on the control axis of the machine 13 are connected in the cathode-anode circuits of a single stage electric valve amplifier which comprises the two electric valves 16 and 17. Although these valves may be of any suitable type, they are preferably beam power amplifier valves. As shown, they are connected for duplex operation and are provided with a self-biasing resistor 18. The cathode-anode circuits of these valves are connected in series with the secondary windings 19a and 19b of a supply transformer 19 of which the primary winding 19d is connected to a suitable source of alternating voltage, such as represented by the two supply lines 20.

The cathode grid, or input, circuit of the amplifier extends from the cathodes 16a and 17a of the valves 16 and 17 through the self-biasing resistor 18 and the ground connection to the center tap of a resistor 21, through opposite halves of resistor 21 and the secondary windings 22a and 22b of the grid control transformer 22 in parallel and resistors 23a, 23b, and 23c, and resistors 24a, 24b, and 24c in parallel to the control grids 16b and 17b, respectively.

With zero voltage applied to the grids 16b and 17b from the transformer secondaries 22a and 22b, the valves 16 and 17 will supply circulating current through the two opposing control field windings 13c and 13d. The magnitude of these circulating currents is controlled as desired by adjustment of the self-biasing resistor 18. This resistor is usually adjusted for half the saturation current of the valve. The circuit is accurately balanced so that both valves normally conduct equal amounts of current. Since the control field windings 13c and 13d oppose each other and are equally excited when no voltage is supplied to the grids 16b and 17b from the transformer 22, the net excitation of dynamoelectric machine 13 is zero. As a result, zero voltage is supplied to the motor 12 and the motor is therefore at standstill. This condition of equal conduction in both valves occurs when the follow-up system is in correspondence, i. e., when the driven object is in positional agreement with the pilot device.

For the purpose of controlling the conduction of the valves 16 and 17 in accordance with the error between the driven object and the pilot device, a voltage of variable magnitude is supplied to the grid circuits substantially in phase with the anode voltage through the transformer 22 whose secondary windings 22a and 22b are connected to the grid circuits of the valves 16 and 17, as explained in the foregoing, and whose primary winding is connected to the single phase alternating current source 25 through rotary induction apparatus illustrated as comprising a rotary induction device 26 referred to as the transmitter, and a similar rotary induction device 27 referred to as the receiver regulator. The rotary induction device 26 comprises a rotor member 26a provided with a single phase winding (not shown) and a stator member 26b provided with a distributed three-element winding (not shown) that is physically similar to the polyphase winding of an ordinary wound-rotor induction motor. The stator and rotor windings are arranged in inductive relationship with each other so that the alternating magnetic field produced by the current flowing in the primary winding induces voltages in the elements of the secondary winding. The receiver regulator is similar to the transmitter 26 and the terminals of its stator winding are connected to the terminals of the stator winding of the transmitter by means of conductors 28 so that the voltages induced in the stator winding of the transmitter cause currents to flow in the stator winding of the receiver regulator, thereby producing a magnetic field similar to the magnetic field produced by the rotor winding of the transmitter. Rotation of the rotor of the transmitter causes a voltage to be induced in the rotor winding of the receiver regulator owing to the shift in the position of the axis of the magnetic field of the receiver regulator relative to the axis winding of the rotor member, and the magnitude of this induced voltage depends upon the relationship of the axis of this winding to the axis of the magnetic field. When the axes of the magnetic field and the rotor winding are parallel, the induced voltage is maximum whereas when these axes are at right angles with each other, the induced voltage is zero. It will therefore be clear that the rotation of the rotor of the transmitter or of the receiver regulator will vary the magnitude of the voltage supplied to the grid circuit of the electric valve apparatus, which in turn, will result in a variation of the relationship of the current flowing in the conducting paths of the valves 16 and 17.

The grid connections from the secondary windings 22a and 22b to the grids 16b and 17b are such that the voltages supplied to the grids are 180 degrees out of phase with each other. Thus when the voltage supplied to one of the grids increases positively, the voltage of the other grid is simultaneously made correspondingly less positive or more negative.

The rotor of the transmitter 26 is mechanically coupled through suitable gearing (not shown) to the movable element of the pilot device 11. For the purpose of increasing the accuracy and sensitivity of the control, the ratio of this gearing between the pilot device and the rotor of the transmitter can be made as large as is desired. For example, the ratio may be 12:1, i. e., for each degree that the pilot device is rotated, the rotor of the transmitter is rotated 12 degrees. The rotor of the receiver regulator 27 is connected either to the shaft of the driving motor 12 or to the shaft of the driven object 10 by means of suitable gearing (not shown) having the same ratio as the gearing between the pilot device and the transmitter.

This large gear ratio provides a very fine and very accurate control. If the ratio is 12:1, as assumed, then for each 30 degrees of rotation of the pilot device, the rotor of the transmitter 26 is rotated a full 360 degrees. However, since the axes of the rotor winding of the receiver regulator 27 and the magnetic field of the stator are parallel at two points in each complete revolution of the transmitter, i. e., at zero degrees revolution and at 180 degrees revolution of the transmitter, it will be clear that the pilot device and the driven object must not be allowed to become more than 15 degrees out of correspondence with each other while under the control of the high speed fine control system, because when this amount of positional disagreement occurs, the same relationship exists between the rotors of the transmitter and receive regulator as exists when the pilot device and driven object are in correspondence with each other. Before power is turned on, the amount of this positional disagreement may be anything up to 180 degrees. A coarser system is, therefore, provided for taking over the control from the high speed fine control system when this amount of positional disagreement (15 degrees) is exceeded. This coarse system is illustrated as comprising a transmitter 29 that is identical with the transmitter 26 and a receiver regulator 30 that is identical with the receiver regulator 27. The single phase rotor winding of the transmitter 29 is connected to the alternating voltage source 25, and the single phase rotor winding of the receiver regulator is connected to the terminals of the primary winding of a transformer 31, the terminals of the secondary winding 31b of which are connected to the grids 16b and 17b through electric valves 32 and 33. The stator windings of the transmitter 29 and the receiver regulator 30 are connected to each other by means of conductor 34.

The rotor of the transmitter 29 is directly connected to the rotatable member of the pilot device 11 by means of a suitable gearing having preferably a 1:1 ratio, and the rotor member of the receiver regulator 30 is connected through suitable gearing (not shown) having the same ratio to the driven object 10. Thus it will be seen that the transmitter 29 and the receiver regulator 30 constitute a low speed system and provide the desired coarse control.

The electric valves 32 and 33 may be of any suitable type but are preferably of the two-electrode type into the envelopes of which a small quantity of an inert gas, such for example as neon, is introduced. A characteristic of a valve of this character is that when a voltage of less than a predetermined critical value is applied to its terminals, the valve does not conduct current, and that when this critical voltage is exceeded, the neon gas becomes ionized and the valve becomes conducting.

The transformer 31 is so designed that when the system error of the pilot device and driven object is less than a predetermined amount, e. g., seven degrees or less, the voltage applied to the valves 32 and 33 is less than the ionization or breakdown voltage of these valves but equals or exceeds the ionization voltage when the system error equals or exceeds this predetermined amount. Thus, when the system error is less than this predetermined amount, the control connections between the coarse control system and the grids 16b and 17b are interrupted, and the coarse control system is ineffective. Conversely, when the error equals or exceeds this amount, the valves 32 and 33 become conducting and the voltage induced in the secondary winding of the transformer 31 is applied to the grids 16b and 17b and is thereafter effective in controlling the valves 16 and 17. The high ohmic resistors 23a, 23b, and 24a and 24b assist the valves 32 and 33 in transferring the control from the fine control system to the coarse control system when the error equals or exceeds the predetermined amount mentioned in the foregoing description.

The error voltage supplied from the receiver regulator of the high speed fine control system to the grid transformer 22 is an alternating voltage having the same frequency as that of the source 25. A plot of the effective or R. M. S. values only of this error voltage is illustrated by the sinusoidal curve 35 in Fig. 2 of which the ordinates represent voltage and abscissae represent system error. Thus at zero error or correspondence, the axes of the rotor winding of the receiver regulator and of the magnetic field of the primary winding are at right angles, and the magnitude of the error voltage is zero. If the error is increased to 7½ degrees clockwise, i. e., the pilot device 11 is advanced 7½ degrees clockwise with respect to the driven object, the displacement of the axes of the magnetic field and of the rotor winding is increased 90 degrees so that they are now parallel and the error voltage attains a maximum value. This error voltage is in phase with the voltage of the source 25. The inphase relationship is indicated by the position of this portion of the curve 35 above the zero axis.

A further increase of the error to 15 degrees clockwise increases the displacement of the axes of the rotor winding and the magnetic field of the stator winding another 90 degrees so that these axes are again at right angles with each other but displaced 180 degrees from their original positional relationship. Consequently, the error voltage is reduced to zero.

If the error is increased beyond 15 degrees clockwise, the phase of the error voltage will be reversed, and this condition is indicated by the position of the portion of the curve 35 between 15 degrees error and 30 degrees error below the zero axis. Thus the amplitude of curve 35 represents the magnitude of the effective value of the error voltage, and positive values of this curve indicate that the voltage is in phase with the voltage of the source 25, and negative values indicate a 180-degree out-of-phase relationship. As indicated, the phase of this voltage reverses for each 15 degrees of error.

The error voltage supplied by the receiver regulator 30 of the low speed coarse control system is also an alternating voltage having the same frequency as that of the source 25. A plot of the effective values of this low speed Selsyn voltage is represented by the curve 36 of Fig. 2. Since the gearing ratio of the low speed coarse control system is 1:1, the error voltage is zero at zero error, maximum at 90 degrees error, and zero again at 180 degrees error. It is in phase with the voltage of the source 25 from zero degrees error to 180 degrees error clockwise and it is 180 degrees out of phase from 180 degrees error clockwise to zero error. In other words, the phase reverses at the zero-degree and 180-degree error points.

It will be noted that within a zone 15 degrees either side of the 180-degree error point, the voltages produced by the fine and coarse Selsyn systems are 180 degrees out of phase with each other. This is indicated in Fig. 2 by the positioning of the curves 35 and 36 on opposite sides of the zero axis within the 15-degree error zone on either side of 180 degrees error. Consequently, as long as the voltage from the transformer 31 of the low speed coarse control system, as represented by curve 36, is greater than the value represented by horizontal lines 37 and 38, at which the control is transferred between the fine and coarse control systems, the driving motor 12 is energized for rotation in a direction to drive the driven object toward the position of zero error or correspondence with the pilot device. However, when this voltage is below the critical value represented by lines 37 and 38, at the time of synchronization the voltage produced by the fine control system which is of reverse phase with respect to the voltage from the coarse control system will energize the motor 12 to drive the object 10 in the reverse direction. In other words, the motor will be energized to drive the object 10 toward the 180-degree error point. If, while the power is removed from the system, the pilot device 11 is moved out of correspondence an amount such that the error of the system falls within a zone of approximately 7½ degrees on either side of the 180-degree error point within which zone the coarse control voltage is less than the critical voltage, and which zone is represented by the vertical lines 39 and 40, the driven object 10 will be synchronized 180 degrees out of correspondence with the pilot device when the power is restored to the system. This operating condition is highly objectionable and it is therefore desirable to eliminate this zone of stable equilibrium described in the foregoing.

For the purpose of eliminating this point of stable equilibrium, the transmitter 29 and receiver regulator 30 of the coarse control system are misaligned by approximately 90/n degrees so that the output voltage of the coarse system is dephased by this amount, or approximately one-quarter cycle of the output voltage of the fine control system. This dephased voltage is represented by the dotted sinusoidal curve 41 in Fig. 2. This curve crosses the zero error axis at point 41a. The ordinate of point 41a is therefore a measure of the voltage produced by the coarse control system at zero error. Such a voltage at zero error would tend to synchronize the system at an error corresponding to the zero point 41b of the dephased voltage curve 41. To eliminate this tendency, a fixed voltage equal in magnitude to the dephased voltage of the coarse control system at the zero error and of opposite phase is added to the output of the receiver regulator 30. This voltage is derived from a secondary winding 19c of transformer 19. The secondary winding is connected in series with the output winding of receiver regulator 30 and the primary winding 31a of transformer 31 by means of conductors 42. The polarity of the connections of the secondary winding 19c in this circuit are such that the phase of the added voltage is opposite to that of the output voltage of the receiver regulator 30 at zero error. The resultant of the two voltages is represented by the sinusoidal curve 43 in Fig. 2. This curve passes through the point of zero error and zero voltage, i. e., the voltage is zero at the zero error.

The voltage represented by curve 43 also passes through zero at point 43a which, owing to the ratio of 12:1 between the high and low speed Selsyn systems which has been assumed, occurs at approximately 165 degrees error clockwise. The voltage represented by curve 43 intersects the lines 37 and 38 which represent the critical voltage at points 43b and 43c, respectively. These points 43b and 43c define a zone on either side of the zero voltage point 43a within which the output voltage of the slow speed Selsyn system represented by curve 43 is in phase with the output voltage of the high speed Selsyn system represented by curve 35. Thus, the point 35a on the curve 35 which represents the voltage of the high speed Selsyn system and which corresponds to the point 43a on curve 43 is a point of unstable equilibrium of the high speed Selsyn system. In other words, for any error between the points 43b and 43c within which zone control of the driving motor 12 is transferred to the high speed Selsyn system, the voltage produced by the high speed Selsyn system will have the same phase as the voltage produced by the low speed Selsyn system, and will therefore cause the motor 12 to drive the driven object toward the zero error point. Thus, the zero error point remains a point of stable equilibrium and the point 35a which corresponds to the point 43a of curve 43, which is the only other zero point of the curve 43, is a point of unstable equilibrium. Thus, the second or false point of stable equilibrium is eliminated. As a result, the driven object 10 cannot be synchronized with the pilot device at a false point of stable equilibrium.

It is not necessary that the second zero point 43a of the voltage represented by curve 43 should coincide exactly with a zero point of unstable equilibrium of the high speed Selsyn system. It is only necessary that no stable zero of the high speed Selsyn system occur within the zone defined by the points 43b and 43c within which control of the driving motor 12 is transferred to the high speed Selsyn system.

Although in accordance with the provisions of the patent statutes this invention is described as embodied in concrete form and the principle thereof has been explained, together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States is:

1. A follow-up control system comprising in combination, a pilot device, a driven object, driving means for said object, coarse and fine controlling means responsive to positional disagreement of said pilot device and driven object for producing periodically varying control voltages for controlling said driving means to drive said object toward a position of correspondence with said pilot device, means for transferring control of said driving means between said fine and coarse controlling means in response to the magnitude of said positional disagreement, means for dephasing the control voltage produced by said coarse control means a predetermined amount with respect to the other of said control voltages, and means for adding to said coarse control voltage an alternating voltage opposite in phase and substantially equal in magnitude to the magnitude of said dephased voltage when said pilot device and driven object are in positional agreement.

2. A follow-up control system comprising in combination, a pilot device, a driven object, driving means for said object, coarse controlling means for producing a relatively small number and fine controlling means for producing a relatively larger number of cycles of a cyclically varying control voltage in response to a predetermined amount of variation in the positional disagreement of said pilot device and driven object for controlling said driving means to drive said object toward positional correspondence with said pilot device, means for transferring control of said driving means between said fine and coarse controlling means at a predetermined value of said positional disagreement, means for dephasing the control voltage produced by said coarse control means approximately one-quarter cycle of the voltage produced by said fine controlling means, and means for adding to the voltage produced by said coarse controlling means an alternating voltage opposite in phase and substantially equal in magnitude to the magnitude of said dephased voltage when said pilot device and driven object are in correspondence.

SIDNEY GODET.